United States Patent
Melsen et al.

(10) Patent No.: US 7,577,137 B2
(45) Date of Patent: Aug. 18, 2009

(54) OPTIMIZED MULTICAST DISTRIBUTION WITHIN A HYBRID PPPOE/IPOE BROADBAND ACCESS NETWORK

(75) Inventors: Torben Melsen, Holstebro (DK); Ole Helleberg Andersen, Bording (DK)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 623 days.

(21) Appl. No.: 11/232,344

(22) Filed: Sep. 21, 2005

(65) Prior Publication Data
US 2006/0182109 A1 Aug. 17, 2006

Related U.S. Application Data

(60) Provisional application No. 60/653,155, filed on Feb. 15, 2005.

(51) Int. Cl.
*H04L 12/28* (2006.01)
*H04L 12/56* (2006.01)
(52) U.S. Cl. .................... 370/389; 370/390; 370/400; 370/432
(58) Field of Classification Search ............... 370/389, 370/390, 392, 400, 401, 432
See application file for complete search history.

(56) References Cited

U.S. PATENT DOCUMENTS

2004/0100970 A1* 5/2004 Gerdisch et al. ........ 370/395.53
2006/0047845 A1* 3/2006 Whited et al. ............... 709/231

OTHER PUBLICATIONS

DSL Forum (Layer 2 Control Mechanism For Architecture and Transport Working Group, Revision 2, Aug. 2004).*
Shoaf S. et al: "IGMP Capabilities in Broadband Network Architectures", Juniper Networks, Inc., www.juniper.net. Mar. 2005, pp. 18-22.
"IGMP Proxying vs Transparent Snooping: WT-101 Applicability", DSL Forum document # dsl2004.471.00 by Jerome Moisand, Juniper Networks (Dec. 7-9, 2004).
"High level requirements for IPTV multicast delivery via PPPoE", BellSouth's functional specification (Dec. 13, 2004).
"The Public Ethernet-The next-generation broadband access network" Michael Begley, 2004.

* cited by examiner

*Primary Examiner*—Chirag G Shah
*Assistant Examiner*—Srinivasa R Reddivalam

(57) ABSTRACT

An access node (e.g., DSLAM) and method for optimizing the distribution of a multicast stream within a hybrid PPPoE/IPoE broadband assess network are described herein. In the preferred embodiment, the DSLAM snoops upstream IGMP messages encapsulated within PPPoE frames, and forwards them transparently towards a BRAS (located in an Ethernet aggregation network). In addition, the DSLAM duplicates the IGMP message and sends the duplicated IGMP message encapsulated within IPoE frames towards the standard Ethernet switches (located in the Ethernet aggregation network). The IPoE encapsulated IGMP message can be snooped by the standard Ethernet switches. This functionality of the DSLAM ensures the optimal multicast distribution by the Ethernet aggregation network.

15 Claims, 4 Drawing Sheets

US 7,577,137 B2

1

OPTIMIZED MULTICAST DISTRIBUTION WITHIN A HYBRID PPPOE/IPOE BROADBAND ACCESS NETWORK

CLAIMING BENEFIT OF PRIOR FILED PROVISIONAL APPLICATION

This application claims the benefit of U.S. Provisional Application Ser. No. 60/653,155 filed on Feb. 15, 2005, the contents of which are incorporated by reference herein.

BACKGROUND OF THE INVENTION

1. Field of the Invention

The present invention relates to an access node (e.g., DSLAM) and method for optimizing the distribution of a multicast stream (mutlicast traffic) within a hybrid PPPoE/IPoE broadband assess network.

2. Description of Related Art

The following abbreviations are herewith defined, at least some of which are referred to in the ensuing description of the prior art and the preferred embodiment of the present invention.

AAA Authentication, Authorization and Accounting
BRAS Broadband Remote Access Server
CPE Customer Premises Equipment
DSL Digital Subscriber Line
DSLAM Digital Subscriber Line Access Multiplexer
IGMP Internet Group Management Protocol
IP Internet Protocol
IPoE IP over Ethernet
PPP Point-to-Point Protocol
PPPoE Point-to-Point Protocol over Ethernet Telecommunication service providers have been trying to build a cost-effective broadband access network, while reusing the existing investments in DSL networks, yet without compromising on the ability to provide high bandwidth services (e.g., internet, television). Thanks to its compatibility with IP, simplicity of deployment, and price-to-performance ratio, Ethernet has been used to help build such a broadband access network. Two known Ethernet based broadband access networks and their drawbacks are described below with respect to FIGS. 1-2.

Referring to FIG. 1 (PRIOR ART), there is a block diagram that illustrates the basic components of a traditional IPoE broadband access network 100. The traditional IPoE broadband access network 100 includes multiple access nodes 102 (e.g., DSLAMs 102) which connect end-users 104 and their multicast devices/CPEs 106 to an Ethernet aggregation network 108. The Ethernet aggregation network 108 includes multiple Ethernet switches 110 (only three shown) and a multicast router 112 all of which are interconnected. The multicast router 112 is coupled to a multimedia server 114. In operation, the multimedia server 114 receives a multicast stream 116 (e.g., TV, radio) from a content provider 118. Then, the multimedia server 114 broadcasts the multicast stream 116 which passes through selected Ethernet switches 110 and selected DSLAMs 102 to the end-users 104 who requested to receive the multicast stream 116 (shown as end-users 104'). A detailed discussion about how all of these components function to distribute the multicast stream 116 to the appropriate end-users 104' is provided next.

In particular, the end-users 104' (only three shown) that desire to receive the multicast stream 116 need to transmit a multicast request 120 (IGMP join message 120) toward their respective DSLAMs 102' (only three shown). Each upstream multicast request 120 contains an address of the desired mul-

2 ticast stream 116. And, each upstream multicast request 120 is encapsulated in IPoE. The DSLAMs 102' snoop the IPoE encapsulated multicast requests 120 and register the particular end-user(s) 104' who requested the multicast stream 116. In addition, the DSLAMs 102' forward the IPoE encapsulated multicast requests 120 towards the multicast router 112. As the multicast requests 120 travel towards the multicast router 112, the Ethernet switches 110 snoop the IPoE encapsulated multicast requests 120 to determine which links 122 they need to use when they forward the downstream multicast stream 116 to the end-users 104'. This snooping is how the DSLAMs 102' and Ethernet switches 110 can effectively distribute the multicast stream 116 (which is also encapsulated in IPoE) to the end-users 104'.

The main drawback of this topology is that IPoE is used to encapsulate the upstream multicast requests 120 and the downstream multicast stream 116. However, most service providers like to use PPPoE as their access protocol because it is in wide-spread use today and because it has a lot of inherent capabilities related to AAA and security. In response to this drawback, a hybrid PPPoE/IPoE broadband access network has been suggested by Juniper Networks and Bell-South. The hybrid PPPoE/IPoE broadband access network addresses this drawback by encapsulating the upstream multicast requests in PPPoE and encapsulating the downstream multicast stream (e.g., content) in IPoE. A detailed discussion about the hybrid PPPoE/IPoE broadband access network is provided in the following documents:

"IGMP Proxying vs Transparent Snooping: WT-101 Applicability", DSL Forum document # dsl2004.471.00 by Jerome Moisand, Juniper Networks (Dec. 7-9, 2004).

"High level requirements for IPTV multicast delivery via PPPoE", BellSouth's functional specification (Dec. 13, 2004).

The contents of these documents are incorporated by reference herein.

A brief discussion about the traditional hybrid PPPoE/IPoE broadband access network 200 and it's main drawback is provided next with respect to FIG. 2 (PRIOR ART). As shown, the traditional hybrid PPPoE/IPoE broadband access network 200 includes multiple access nodes 202 (e.g., DSLAMs 202) which connect end-users 204 and their multicast devices/CPEs 206 to an Ethernet aggregation network 208. The Ethernet aggregation network 208 includes multiple Ethernet switches 210 (only three shown), a multicast router 212 and a BRAS 213 all of which are interconnected. The BRAS 213 is coupled to the Internet 215. And, the multicast router 212 is coupled to a multimedia server 214. In operation, the multimedia server 214 receives a multicast stream 216 (e.g., TV, radio) from a content provider 218. Then, the multimedia server 214 broadcasts the multicast stream 216 which passes through all of the Ethernet switches 210 and selected DSLAMs 202 to the end-users 204 who requested to receive the multicast stream 216 (shown as end-users 204'). A detailed discussion about how all of these components function to distribute the multicast stream 216 to the appropriate end-users 204' is provided next.

In particular, the end-users 204' (only three shown) that desire to receive the multicast stream 216 need to transmit a multicast request 220 (IGMP join message 220) toward their respective DSLAMs 202' (only three shown). Each upstream multicast request 220 contains an address of the desired multicast stream 216. And, each upstream multicast request 220 is encapsulated in PPPoE (compare to FIG. 1). The DSLAMs 202' snoop the PPPoE encapsulated multicast requests 220 and register their particular end-user(s) 204' who requested the multicast stream 216. In addition, the DSLAMs 202' transparently forward the PPPoE encapsulated multicast requests 220 through the Ethernet switches 210 towards the BRAs 213. And, the Ethernet switches 210 transparently forward the PPPoE encapsulated multicast requests 220 towards the BRAs 213 and not the multicast router 212 (which would not know what to do with PPPoE encapsulated multicast requests 220 since it does not support PPP). However, the Ethernet switches 210 cannot snoop the PPPoE encapsulated multicast requests 220.

This is a problem since the Ethernet switches 210 are not able to determine the links 222 they need to use to forward the downstream multicast stream 216 to the end-users 204'. To solve this problem, the Ethernet switches 210 flood all of their ports with the multicast stream 216 and send the multicast stream 216 on both appropriate links 222 and non-appropriate links 222' towards all of the DSLAMs 202. This wastes bandwidth in the traditional hybrid PPPoE/IPoE broadband access network 200. In this example, the wasted bandwidth can be seen in Ethernet switch 210' where the non-appropriate link 222' is flooded with the downstream multicast stream 216 but there is no end-user 204' associated with this link 222' or with the corresponding DSLAM 202. As such, the Ethernet switches 210 do not effectively distribute the multicast stream 216 (which is encapsulated in IPoE) to the end-users 204'. This problem is solved by the present invention.

BRIEF DESCRIPTION OF THE INVENTION

The present invention relates to an access node (e.g., DSLAM) and method for optimizing the distribution of a multicast stream within a hybrid PPPoE/IPoE broadband assess network. In the preferred embodiment, the DSLAM snoops upstream IGMP messages encapsulated within PPPoE frames, and forwards them transparently towards a BRAS (located in an Ethernet aggregation network). In addition, the DSLAM duplicates the IGMP message and sends the duplicated IGMP message encapsulated within IPoE frames towards the standard Ethernet switches (located in the Ethernet aggregation network). The IPoE encapsulated IGMP message can be snooped by the standard Ethernet switches. This functionality of the DSLAM ensures the optimal multicast distribution by the Ethernet aggregation network.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 3:
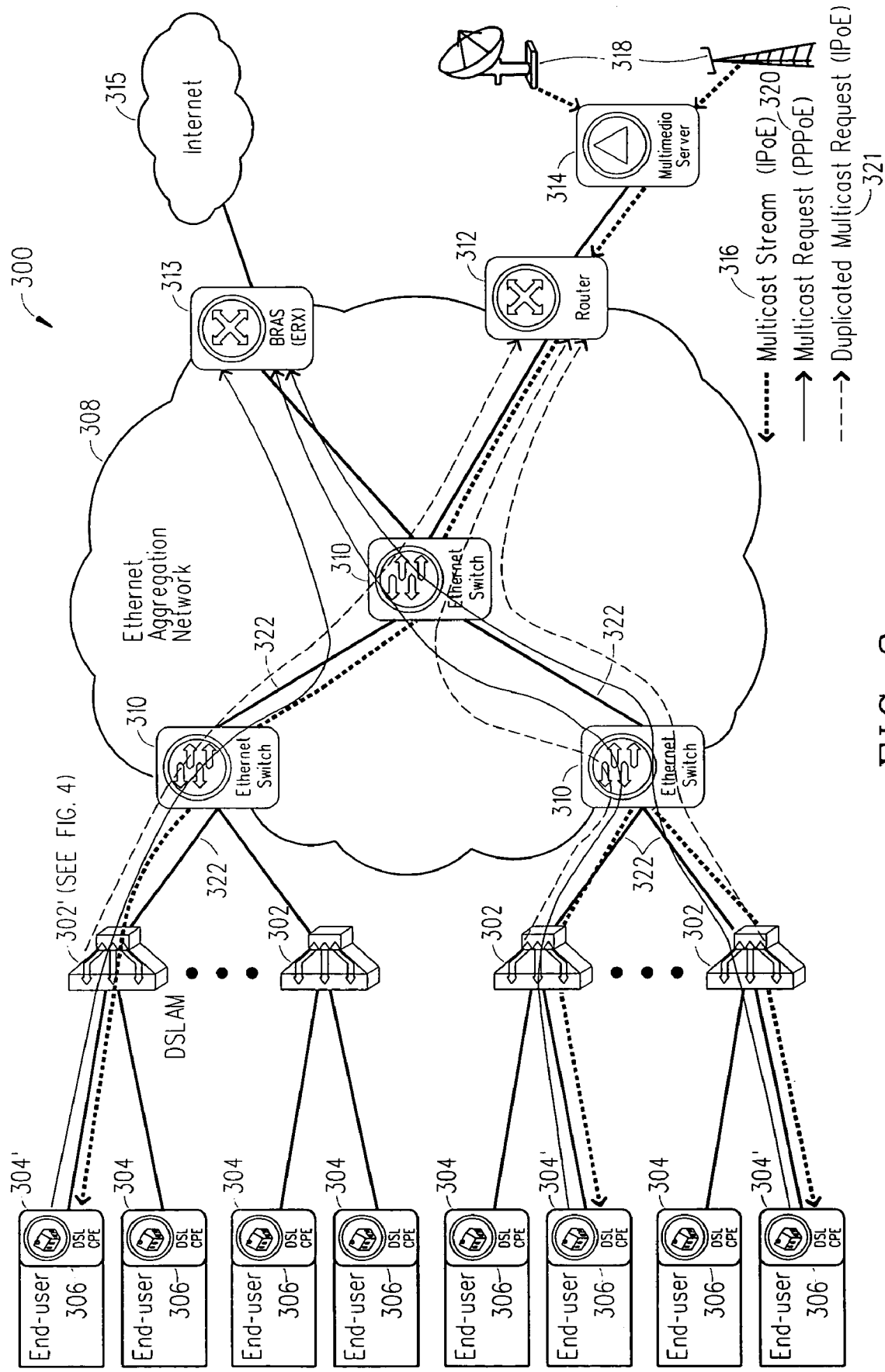
FIG. 3 is a block diagram that illustrates the basic components of a hybrid PPPoE/IPoE broadband access network in accordance with the present invention.

Referring to FIG. 3, there is a block diagram that illustrates the basic components of a hybrid PPPoE/IPoE broadband access network 300 in accordance with the present invention. The hybrid PPPoE/IPoE broadband access network 300 includes multiple access nodes 302 (e.g., DSLAMs 302) which connect end-users 304 and their multicast devices/CPEs 306 to an Ethernet aggregation network 308. The Ethernet aggregation network 308 has multiple Ethernet switches 310 (only three shown), a multicast router 312 and a BRAS 313 all of which are interconnected. The BRAS 313 is coupled to the Internet 315. And, the multicast router 312 is coupled to a multimedia server 314. In operation, the multimedia server 314 receives a multicast stream 316 (e.g., TV, radio) from a content provider 318. Then, the multimedia server 314 broadcasts the multicast stream 316 via selected Ethernet switches 310 and selected DSLAMs 302 to the end-users 304 who requested to receive the multicast stream 316 (shown as end-users 304'). A detailed discussion about how all of these components function to distribute the multicast stream 316 to the appropriate end-users 304' is provided next.

Figure 4:
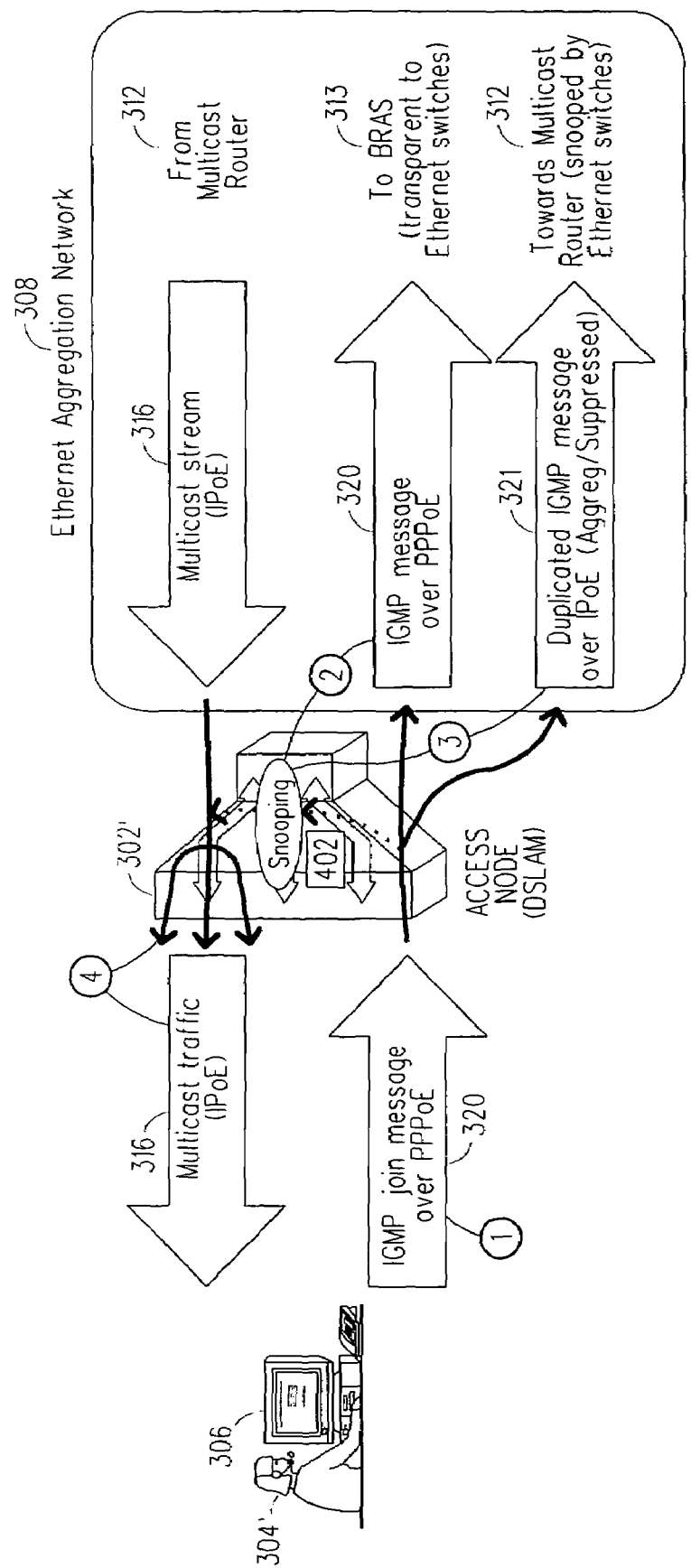
FIG. 4 is a block diagram that illustrates the basic function of a DSLAM that is present in the hybrid PPPoE/IPoE broadband access network shown in FIG. 3 in accordance with the present invention.

In particular, the end-users 304' (only three shown) that desire to receive the multicast stream 316 need to transmit a multicast request 320 (IGMP join message 320) toward their respective DSLAMs 302' (see step "1" in FIG. 4). Each upstream multicast request 320 contains an address of the desired multicast stream 316. And, each upstream multicast request 320 is encapsulated in PPPoE. The DSLAMs 302' snoop the PPPoE encapsulated multicast requests 320 and transparently forward them towards the Ethernet aggregation network 308 (see step "2" in FIG. 4). In addition, the DSLAMs 302' replicate the payload (e.g., IGMP payload) in the multicast requests 320 and form a duplicated multicast request 321 which is encapsulated in IPoE (see step "3" in FIG. 4). The DSLAMs 302' then forward the IPoE encapsulated multicast requests 321 towards the Ethernet aggregation network 308. Each of the DSLAMs 302' also register the particular end-users 304' who requested the multicast stream 316.

Figure 1:
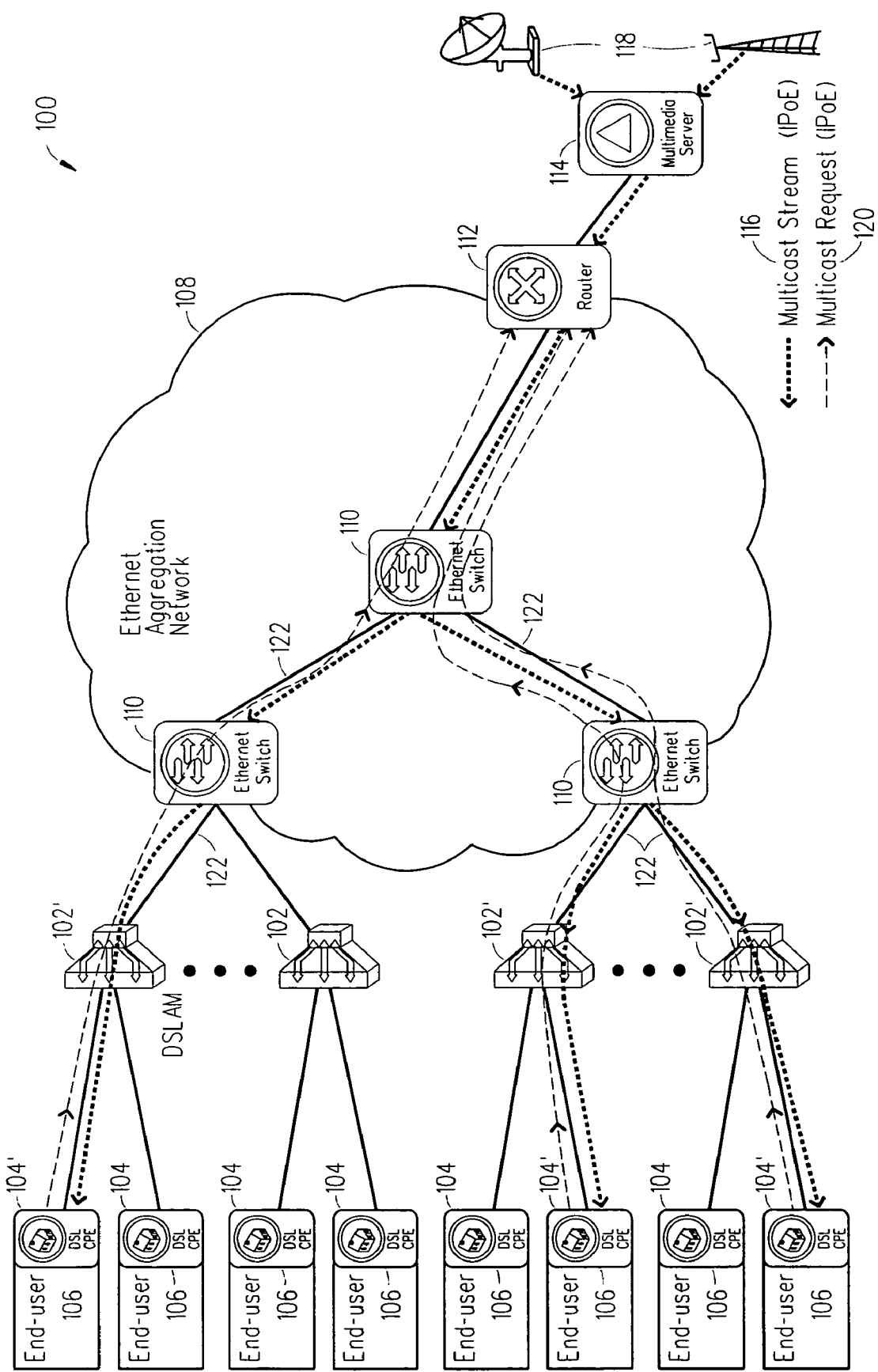
FIG. 1 (PRIOR ART) is a block diagram that illustrates the basic components of a traditional IPoE broadband access network.
Figure 2:
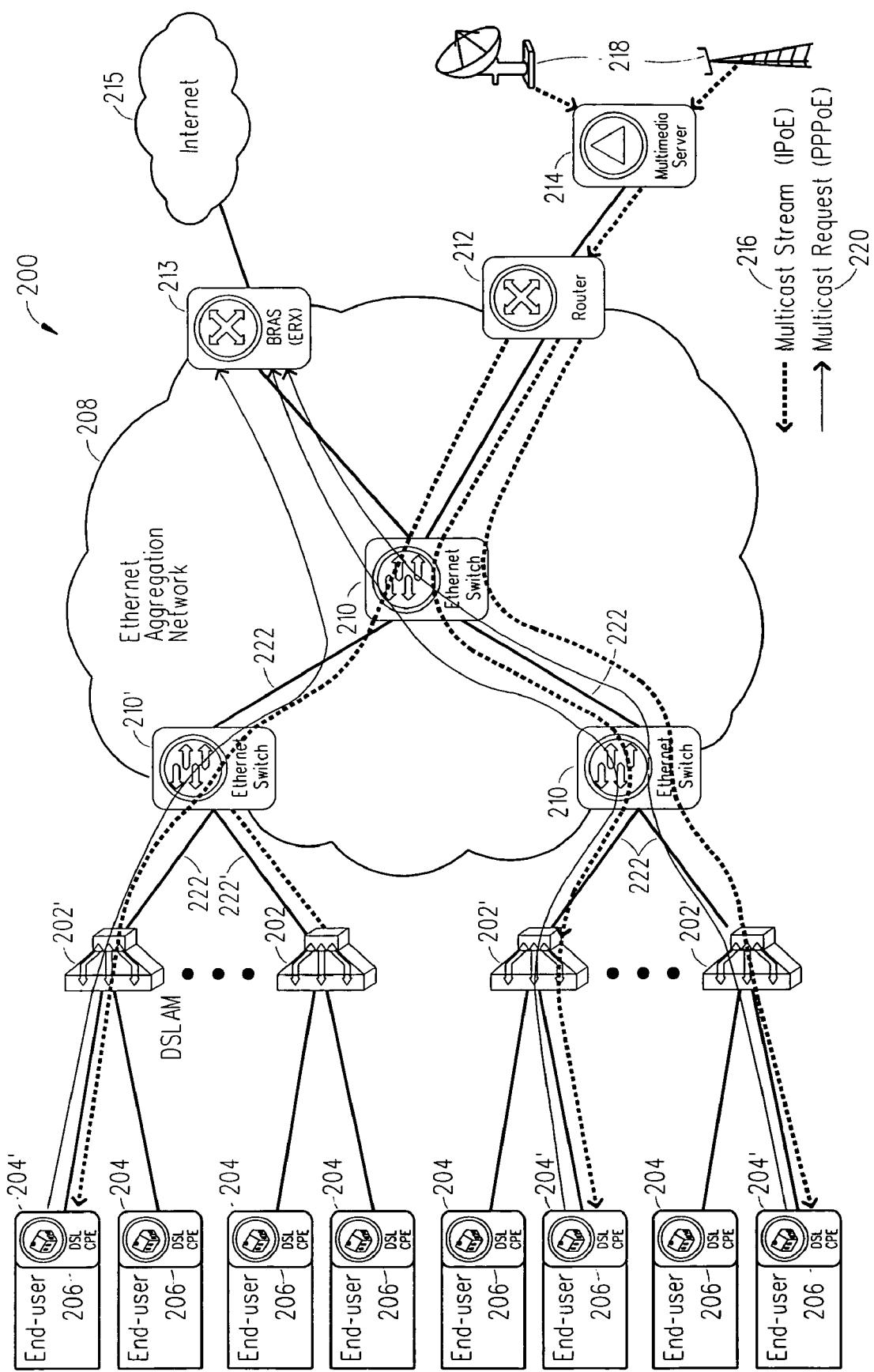
FIG. 2 (PRIOR ART) is a block diagram that illustrates the basic components of a traditional hybrid PPPoE/IPoE broadband access network.

As the PPPoE encapsulated multicast requests 320 travel towards the BRAS 313, the Ethernet switches 310 are not able to snoop those requests 320 (see discussion above with respect to FIG. 2). However, the Ethernet switches 310 are able to snoop the IPoE encapsulated multicast requests 321. And, since the Ethernet switches 310 can snoop the IPoE encapsulated duplicated multicast requests 321 they can determine which links 322 need to be used when they forward the downstream multicast stream 316 to the end-users 304'. This snooping is how the DSLAMs 302' and Ethernet switches 310 can effectively distribute the multicast stream 316 (which is encapsulated in IPoE) to the end-users 304'. A detailed discussion about how all of these components function to distribute the multicast stream 316 to the appropriate end-users 304' is provided next.

The multicast router 312 (possibly controlled by the BRAS 313) issues the downstream multicast stream 316. The Ethernet switches 310 then forward the multicast stream 316 only on the links 322 leading to DSLAMs 302' that are connected to the end-users 304' who requested the multicast stream 316. The DSLAMs 302' then forward the multicast stream 316 to the end-users 304' (see step "4" in FIG. 4). This is a marked-improvement over the traditional hybrid PPPoE/IPoE broadband access network 200 in which the Ethernet switches 210 could not snoop the PPPoE encapsulated request messages 220 (see FIG. 2). As such, the Ethernet switches 210 could not determine which links 222 they needed to use in order to forward the downstream multicast stream 216 to the end-users 204'. To solve this problem, the Ethernet switches 210 flooded all of their ports with the multicast stream 216 and sent the multicast stream 216 on both the appropriate links 222 and the non-appropriate links 222' towards all of the DSLAMs 202. This wasted bandwidth. As can be seen, the hybrid PPPoE/IPoE broadband access network 300 of the present invention does not suffer from this problem and does not waste bandwidth.

Following are some additional features and advantages associated with the present invention:

The optimized use of network bandwidth in accordance with the present invention, as opposed to the flooding of all multicast streams as was done in the past creates an upwards scalable solution for multicast distribution.

The DSLAMs 302, Ethernet switches 310 and BRAS 313 each have a processor/logic/computer incorporated therein that can perform various actions of the present invention by using specialized circuits or circuitry (e.g., discrete logic gates interconnected to perform a specialized function), program instructions, or a combination of both. For example, the DSLAM 302' shown in FIG. 4 illustrates such a processor 402.

The multicast router 312 may be integrated as a part of the BRAS 313 (not shown) or it may be a separate device (shown). The latter architecture is the same as the reference model of DSL Forum's Working Text "WT-101" for broadband access over an Ethernet aggregation network.

The IGMP message (packet) 321 that is IPoE encapsulated by the DSLAM 302 may be subject to various aggregation/suppression mechanisms. Such mechanisms may be implemented in the DSLAM 302 or anywhere in the Ethernet aggregation network 308.

The description provided herein about the different components (e.g., DSLAMs 302, Ethernet switches 310, BRAS 313) in the hybrid PPPoE/IPoE broadband access network 300 omits certain details about those components that are well known in the industry and are not necessary to understand the present invention. This is done for clarity.

It should be appreciated that the configurations of the various broadband access networks 100, 200 and 300 described herein are exemplary. And, that these broadband access networks 100, 200 and 300 can have a wide-variety of configurations.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A method for distributing a multicast stream within a hybrid PPPoE/IPoE broadband access network, said method comprising the steps of:

snooping, at a DSLAM, an IGMP message encapsulated in PPPoE which was issued by a multicast device that is used by an end-user who is requesting to receive the multicast stream;

duplicating, at said DSLAM, the IGMP message;

forwarding, from said DSLAM, the IGMP message encapsulated in PPPoE towards a BRAS;

forwarding, from said DSLAM, the duplicated IGMP message encapsulated in IPoE towards at least one Ethernet switch;

wherein said at least one Ethernet switch does not snoop the IGMP message encapsulated in PPPoE; and wherein said at least one Ethernet switch snoops the duplicated IGMP message encapsulated in IPoE and forms forwarding rules for distributing the multicast stream such that when a multimedia server issues the multicast stream to a multicast router which in turn forwards the multicast stream towards the at least one Ethernet switch then the at least one Ethernet switch will forward the multicast stream only on links directed towards said DSLAM which forwards the multicast stream to the multicast device used by said end-user.

2. The method of claim 1, wherein said multicast stream is encapsulated in IPoE.

3. The method of claim 1, wherein said BRAS instructs said multimedia server when to issue the multicast stream.

4. The method of claim 1, wherein said BRAS and said multicast router are integrated.

5. The method of claim 1, wherein said duplicated IGMP message is an aggregated/suppressed duplicated IGMP message.

6. An access node within a hybrid PPPoE/IPoE broadband access network, said access node comprising:

a processor; and control circuitry through which the processor causes the access node to perform the steps of:

snooping a join message issued by a multicast device utilized by an end user who is requesting to receive a multicast stream, wherein the join message is encapsulated in PPPoE;

duplicating the join message to form a duplicated join message;

forwarding the join message encapsulated in PPPoE toward a Broadband Remote Access Server (BRAS);

forwarding the duplicated join message encapsulated in IPoE toward an Ethernet switch which snoops the duplicated join message encapsulated in IpoE;

wherein the processor also causes the access node to register the end-user associated with the join message and to perform the steps of:

receiving a multicast stream encapsulated in IPoE from the Ethernet switch which forwards the multicast stream only on links directed towards the access node; and forwarding the multicast stream encapsulated in IPoE to the end-user.

7. The access node of claim 6, wherein the join message is an IGMP join message.

8. The access node of claim 6, wherein the access node is a Digital Subscriber Line Access Multiplexer (DSLAM).

9. A hybrid PPPoE/IPoE broadband access network for distributing a multicast stream issued by a multimedia server, said access network comprising:

an access node; and an aggregation network, coupled to the access node, said aggregation network including:

an Ethernet switch;

a Broadband Remote Access Server (BRAS); and a multicast router for receiving the multicast stream from the multicast server; and for forwarding the multicast stream towards the Ethernet switch;

wherein the access node includes:

a first processor; and control circuitry through which the first processor causes the access node to perform the steps of:

snooping a join message issued by a multicast device utilized by an end-user who is requesting to receive the multicast stream, wherein the join message is encapsulated in PPPoE;

duplicating the join message to form a duplicated join message;

forwarding the join message encapsulated in PPPoE toward the BRAS; and forwarding the duplicated join message encapsulated in IPoE toward the Ethernet switch;

wherein the Ethernet switch does not snoop the join message encapsulated in PPPoE; and wherein the Ethernet switch includes:

a second processor; and control circuitry through which the second processor causes the Ethernet switch to perform the steps of:

snooping the duplicated join message encapsulated in IPoE; and forming forwarding rules for distributing the multicast stream, wherein when the Ethernet switch receives the multicast stream from the multicast router, the Ethernet switch forwards the multicast stream only on links directed towards the access node, which forwards the multicast stream to the multicast device utilized by the end-user.

10. The hybrid PPPoE/IPoE broadband access network of claim 9, wherein the first processor also causes the access node to register the end-user associated with the join message.

11. The hybrid PPPoE/IPoE broadband access network of claim 9, wherein the join message is an IGMP join message.

12. The hybrid PPPoE/IPoE broadband access network of claim 11, wherein the IGMP message indicates an address of the requested multicast stream.

13. The hybrid PPPoE/IPoE broadband access network of claim 9, wherein the access node is a Digital Subscriber Line Access Multiplexer (DSLAM).

14. The hybrid PPPoE/IPoE broadband access network of claim 9, wherein the BRAS and the multicast router are integrated.

15. The hybrid PPPoE/IPoE broadband access network of claim 9, wherein the duplicated IGMP message is an aggregated/suppressed duplicated IGMP message.

* * * * *

UNITED STATES PATENT AND TRADEMARK OFFICE
CERTIFICATE OF CORRECTION

PATENT NO. : 7,577,137 B2
APPLICATION NO. : 11/232344
DATED : August 18, 2009
INVENTOR(S) : Melsen et al.

It is certified that error appears in the above-identified patent and that said Letters Patent is hereby corrected as shown below:

On the Title Page, in item (73), under "Assignee", delete "Telefonaktiebolage" and insert -- Telefonaktiebolaget --, therefor.

On the Title Page, in item (57), under "ABSTRACT", in Column 2, Line 3, delete "assess" and insert -- access --, therefor.

In Column 1, Line 17, delete "(mutlicast" and insert -- (multicast --, therefor.

In Column 3, Line 3, delete "BRAs" and insert -- BRAS --, therefor.

In Column 3, Line 5, delete "BRAs" and insert -- BRAS --, therefor.

In Column 6, Line 33, in Claim 6, delete "IpoE;" and insert -- IPoE; --, therefor.

Signed and Sealed this

Seventeenth Day of November, 2009

David J. Kappos
*Director of the United States Patent and Trademark Office*